(12) United States Patent
Mirzaei (10) Patent No.: US 8,941,348 B2
(45) Date of Patent: Jan. 27, 2015

(54) MOTOR PROTECTION SYSTEM

(71) Applicant: Caterpillar Global Mining LLC, Oak Creek, WI (US)

(72) Inventor: Saeid Mirzaei, Greendale, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 212 days.

(21) Appl. No.: 13/718,462

(22) Filed: Dec. 18, 2012

(65) Prior Publication Data

US 2014/0168827 A1     Jun. 19, 2014

(51) Int. Cl.
*H02P 1/16* (2006.01)
*H02H 3/08* (2006.01)

(52) U.S. Cl.
CPC .................................. *H02H 3/083* (2013.01)
USPC ................................ 318/778; 318/77; 318/85

(58) Field of Classification Search
USPC ............................. 318/778, 77, 85; 361/31, 23
See application file for complete search history.

(56) References Cited

U.S. PATENT DOCUMENTS

| | | |
|---|---|---|
| 2,991,396 A | 7/1961 | Schurr |
| 3,581,172 A | 5/1971 | Tsuboi et al. |
| 3,742,303 A | 6/1973 | Dageford |
| 4,108,264 A | 8/1978 | Tanaka |
| 4,264,894 A | 4/1981 | Ellington |
| 4,279,009 A | 7/1981 | Andronov et al. |
| 4,849,849 A | 7/1989 | Zucker et al. |
| 5,396,214 A | 3/1995 | Kumar |
| 6,121,695 A | 9/2000 | Loh |
| 6,873,504 B2 | 3/2005 | Lifson et al. |
| 7,692,430 B2 | 4/2010 | Emori et al. |
| 7,746,604 B2 | 6/2010 | McNally et al. |
| 8,102,077 B2 | 1/2012 | Neher |
| 8,251,168 B2 | 8/2012 | Bharani et al. |
| 2003/0119382 A1* | 6/2003 | Narusevicius et al. ........ 439/874 |
| 2004/0145844 A1 | 7/2004 | Franke et al. |
| 2005/0162796 A1 | 7/2005 | Arenz et al. |
| 2006/0247795 A1 | 11/2006 | Gass et al. |
| 2007/0008741 A1 | 1/2007 | Al-Khayat et al. |
| 2007/0266074 A1 | 11/2007 | Dellacona |
| 2008/0211415 A1 | 9/2008 | Altamura |
| 2009/0115424 A1* | 5/2009 | King et al. ..................... 324/511 |

(Continued)

FOREIGN PATENT DOCUMENTS

JP             56035603        4/1981

OTHER PUBLICATIONS

U.S. Appl. No. 13/596,979, filed Aug. 28, 2012, Mirzaei.

*Primary Examiner* — Karen Masih
(74) *Attorney, Agent, or Firm* — Foley & Lardner LLP (57) ABSTRACT

System and methods for protecting motors of a vehicle are provided. A system includes a current transformer device for each phase of the three-phase power received by each protected motor. Each current transformer device includes a switch that is normally in a first position and is configured to monitor an output current of fuse through which the power is transmitted, compare the output current to a threshold current level, and, when the output current is below the threshold current level, change the switch to a second position. The system also includes a processing circuit configured to control operation of the one or more motors of the vehicle. The processing circuit is configured to determine whether one or more of the switches of the plurality of current transformer devices is in the second position and, if so, activate a fault condition.

28 Claims, 7 Drawing Sheets

(56) References Cited

U.S. PATENT DOCUMENTS

2009/0293760 A1 12/2009 Kumar et al.
2011/0122667 A1 5/2011 Mino et al.
2012/0230843 A1 9/2012 Ravipati et al.
2012/0275069 A1 11/2012 Dooley

* cited by examiner

MOTOR PROTECTION SYSTEM

TECHNICAL FIELD

The present disclosure relates generally to the field of power protection systems for motors. More specifically, the present disclosure relates to systems and methods for protecting motors of a vehicle, such as blower motors for cooling parts of the vehicle, from damage that may occur due to loss of one or more phases of input power.

BACKGROUND

Industrial vehicles, such as mining trucks and locomotives, with electric or hybrid drive systems often include large components, such as motors and alternators, that generate a substantial amount of heat. These components may be cooled using blower motors or other cooling mechanisms designed to help dissipate heat.

Motors are often protected by fuses that are designed to prevent damage to the motors due to a current surge. A fuse is typically provided on each input power line; a motor powered by a three-phase power source has three incoming power lines that are each protected by a separate fuse. When a fuse is damaged or blown, the fuse prevents current from traveling to the motor on the line to which the fuse is coupled. This causes a single phasing condition in the motor in which the motor is no longer powered by three-phase input power. Single phasing of the motor can cause a high current condition in the motor, for example, when a motor is activated from a stopped position.

U.S. Pat. No. 3,742,303 ("the '303 patent") of Dageford, which issued on Jun. 26, 1973, discloses a system that detects a single phasing condition and discontinues the supply of voltage to a compressor motor in the event of single phasing. The system of the '303 patent includes two current transformers connected to the three-phase power supply. The first transformer monitors current on one phase of the three-phase line, and the second transformer monitors current on another phase of the three-phase line. The output of the current transformers is sent to current sensors, and the output of the current sensors and a temperature sensor is used to control a switch. The switch controls operation of a magnetic contactor configured to discontinue supply of power to the compressor motor.

Conventional motor protection systems monitor one or more phases of an input power line of a motor and directly trigger mechanical devices to cut off power to the motor in the event that single phasing is detected. Such systems typically can only respond to a single phasing condition by discontinuing power to the motor being protected; they may not be capable of providing information about the single-phasing condition to a user and/or controlling operation of other systems or devices that may be affected by the motor being shut down. Such motor protection systems may not be configured to separately monitor current on all three phases of a three-phase input power line.

The motor protection systems of the present disclosure solve one or more problems set forth above and/or other problems of the prior art.

SUMMARY

One embodiment of the disclosure relates to a system for protecting one or more motors of a vehicle. The one or more motors are configured to receive three-phase power from an alternator of the vehicle. The vehicle includes a plurality of fuses, each fuse being provided between the alternator and one of the one or more motors of the vehicle for each phase of the three-phase power. The system includes a plurality of current transformer devices. The plurality of current transformer devices includes a current transformer device for each phase of each of the one or more motors of the vehicle. Each current transformer device includes a switch that is normally in a first position. Each current transformer device is configured to monitor an output current of one of the plurality of fuses, compare the output current to a threshold current level, and, when the output current is below the threshold current level, change the switch to a second position. The system also includes a processing circuit configured to control operation of the one or more motors of the vehicle. The processing circuit is configured to determine whether one or more of the switches of the plurality of current transformer devices is in the second position. When one or more of the switches of the plurality of current transformer devices is determined to be in the second position, the processing circuit is configured to activate a fault condition.

Another embodiment relates to a vehicle including an alternator, at least one traction motor configured to move at least a portion of the vehicle, and one or more blower motors configured to cool one or more of the at least one traction motor and the alternator. The one or more blower motors and the at least one traction motor are configured to receive three-phase power from the alternator. The vehicle further includes a plurality of fuses, each of which is positioned between the alternator and one of the one or more blower motors for each phase of the three-phase power. The vehicle further includes a plurality of current transformer devices. The plurality of current transformer devices includes a current transformer device for each phase of each of the one or more blower motors. Each current transformer device includes a switch that is normally in a first position. Each current transformer device is configured to monitor an output current of one of the plurality of fuses, compare the output current to a threshold current level, and, when the output current is below the threshold current level, change the switch to a second position. The vehicle further includes a processing circuit configured to control operation of the one or more blower motors of the vehicle. The processing circuit is configured to determine whether one or more of the switches of the plurality of current transformer devices is in the second position. When one or more of the switches of the plurality of current transformer devices is determined to be in the second position, the processing circuit is configured to activate a fault condition.

Another embodiment relates to a method of protecting one or more motors of a vehicle. The one or more motors are configured to receive three-phase power from an alternator of the vehicle. The vehicle includes a plurality of fuses, each fuse being provided between the alternator and one of the one or more motors of the vehicle for each phase of the three-phase power. The method includes monitoring, using a plurality of current transformer devices, output current from the plurality of fuses. The plurality of current transformer devices includes a current transformer device for each phase of each of the one or more motors of the vehicle and each current transformer device includes a switch that is normally in a first position. Monitoring output current from the plurality of fuses includes using a separate current transformer device to monitor an output current of each of the plurality of fuses. The method further includes comparing, at each of the plurality of current transformer devices, the output current to a threshold current level and changing the switch of the current transformer device to a second position when the output current is below the threshold current level. The method further includes determining, using a processing circuit configured to control operation of the one or more motors, whether one or more of the switches of the plurality of current transformer devices is in the second position. The method further includes activating a fault condition when one or more of the switches of the plurality of current transformer devices is determined to be in the second position.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
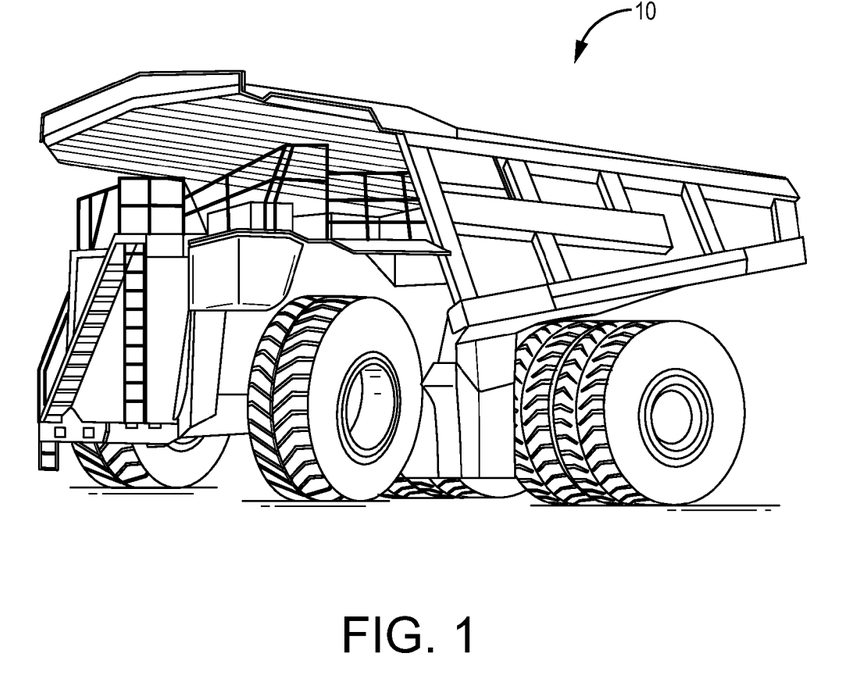
FIG. 1 is an illustration of a mining truck according to an exemplary embodiment.

Referring generally to the figures, systems and methods for protecting a motor, such as a blower motor for use in cooling components of a vehicle (e.g., a mining truck or locomotive), from a single phasing condition are shown according to various exemplary embodiments. Large industrial vehicles such as mining trucks or locomotives often include components that produce a substantial amount of heat. Such vehicles may utilize cooling systems, such as blowers designed to push air over the hot components, to help dissipate heat in order to avoid damage to the components due to excessive heat and to prolong the life of the components. For example, mining trucks may use one or more blowers to push air over the windings of alternators and traction motors (e.g., motors designed to move one or more parts or sides of the vehicles). An example mining truck 10 is illustrated in FIG. 1 according to an exemplary embodiment.

Blower motors of large industrial vehicles are typically powered by three-phase power provided by an alternator. Fuses are often provided between the alternator and motor on each of the three-phase power lines to protect the motor against a high instantaneous current condition that could damage the motor. Such a high current condition on one of the three-phase lines will cause the fuse to blow, disconnecting the line from the motor and preventing the dangerous current from traveling to the motor on that line. The loss of one of the phases results in a single phasing condition in the motor that can cause damage to the motor (e.g., due to high inrush currents on the remaining phases, for example, during startup of the motor). A single phasing condition may also be caused by a loose wire on one of the three-phase input lines.

The present disclosure provides systems and methods for protecting one or more motors (e.g., blower motors) of a vehicle against a single phasing condition, for example, due to a blown fuse or a loose wire. A separate current transformer device may be provided for each phase of three-phase input power lines of a motor. Each current transformer device monitors the output current of one of the fuses and compares the output current to a threshold (e.g., a low threshold, such that an output current below the threshold indicates that current is no longer being effectively transmitted on the monitored line). When the output current is below the threshold, a switch of the current transformer device is changed to a different state. For example, if the switch is a normally closed switch, the switch may be opened, and if the switch is a normally opened switch, the switch may be closed.

The state of the switches may be monitored by a processing circuit that is configured to control operation of the motor(s). The processing circuit may determine whether one of the switches has changed state (e.g., has been opened) and, if so, activate a fault condition. In some embodiments, the processing circuit may be configured to shut down and/or block the supply of power to the motor in response to the fault condition. In some embodiments, the processing circuit may shut down operation of the alternator, effectively discontinuing the supply of current to the entire electrical system powered by the alternator and shutting the electrical system down. In some embodiments, the processing circuit may activate an alarm to the user informing the user of the fault and/or providing information about which particular motor and/or current transformer device is associated with the flipped switch. In some embodiments, temperature sensors may be provided to additionally monitor temperature on each of the phases of the motor to prevent heat damage to the motor. Conventional systems may be configured to only monitor AC power input having a limited range of frequencies, such as 50-60 Hz. Some embodiments of the disclosure may be designed to be operational nearly independently of power supply voltage and/or frequency. For example, some embodiments may be configured to operate with a wide range of input power frequencies (e.g., up to 128 Hz, such as in the range of 46 Hz to 128 Hz) and/or an input power voltages (e.g., up to 1300 V, such as in the range of 480 V to 1300 V).

In some embodiments, the protection system may be designed to minimize the amount of processing circuit inputs used to monitor the states of the switches. For example, all of the switches may be placed in series with one another and connected to a single input of the processing circuit. This may allow processing circuits with limited inputs to monitor the switches on a separate input rather than connecting the switches to an input that is also used for another purpose. For example, if the input to which the switches are connected is also used to monitor air pressure of a traction motor, when a fault occurs at the input, the processing circuit cannot discern whether the fault occurred as a result of a single phasing condition or an air pressure problem in the traction motor. In some embodiments (e.g., when multiple processing circuit inputs are available for use), each of the switches may be connected to separate inputs, or the switches may be grouped into sets (e.g., by the motor with which they are associated) and each set may be connected to a separate input. This may allow the processing circuit to provide more detailed information to a user regarding the motor and/or phase with which the fault is associated (e.g., for maintenance purposes to repair the system and clear the fault).

Figure 2:
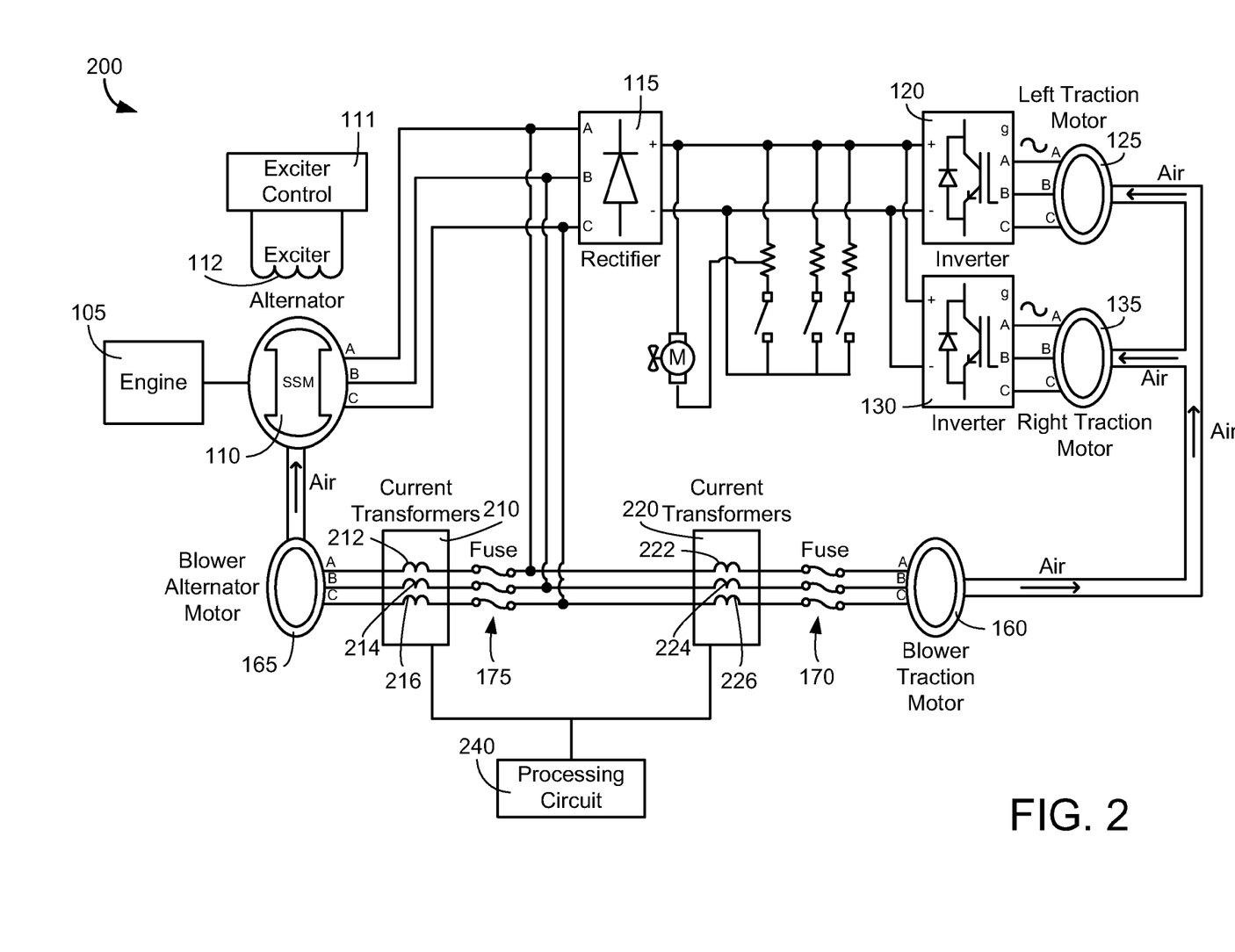
FIG. 2 is a schematic diagram of motor drive circuit according to an exemplary embodiment.

FIG. 2 illustrates a schematic diagram of a motor drive circuit 200 according to one exemplary embodiment. Circuit 200 includes an alternator 110 that is driven by an engine 105 and is configured to generate electrical power used by an electrical drive system of a vehicle. Three-phase alternating current (AC) power is transmitted from alternator 110 to a rectifier 115 configured to convert the three-phase AC power into direct current (DC) power. The DC power is subsequently transmitted from rectifier 115 to an inverter 120 configured to convert the DC power into AC power and to transmit the AC power to a first traction motor 125. The DC power is also transmitted from rectifier 115 to an inverter 130 configured to convert the DC power into AC power and to transmit the AC power to a second fraction motor 135. In some embodiments, traction motors 125 and 135 may be configured to move different parts of the vehicle (e.g., a left side and a right side, a front end and a back end, etc.).

Alternator 110 is also configured to drive two blower motors configured to cool different portions of the vehicle. For example, an alternator blower motor 165 is configured to cool alternator 110, and a traction blower motor 160 is configured to cool traction motors 125 and 135. Blower motors 160 and 165 may be protected against high instantaneous current events by fuses 170 and 175, respectively. Fuses 170 and 175 may each include a separate fuse for each line of the three-phase power provided to motors 160 and 165.

Circuit 200 includes protection circuitry designed to protect against the occurrence of a single phasing condition in blower motors 160 and 165, for example, due to a blown fuse or a loose or open connection on one of the three-phase lines connecting alternator 110 to blower motors 160 and 165. Circuit 200 includes a current transformer set 210 configured to protect alternator blower motor 165 against a single phasing condition and a current transformer set 220 configured to protect traction blower motor 160 against a single phasing condition. Current transformer set 210 includes three separate current transformer devices 212, 214, and 216 configured to monitor the output of the fuses on the first, second, and third lines of the three-phase power input to alternator blower motor 165. Current transformer set 220 includes three separate current transformer devices 222, 224, and 226 configured to monitor the output of the fuses on the first, second, and third lines of the three-phase power input to fraction blower motor 160. Each of current transformer devices 212, 214, 216, 222, 224, and 226 is configured to monitor the output current from the fuse to which it is connected and determine whether the output current has dropped below a threshold current (e.g., a low current level indicating that the fuse is no longer effectively transmitting current for its respective phase). When an output current below the threshold is detected, a switch of the respective current transformer device 212, 214, 216, 222, 224, and 226 is switched from a first, normal state or position (e.g., a closed state) to a second state or position (e.g., open).

A processing circuit 240 may monitor the state of the switches of current transformer devices 212, 214, 216, 222, 224, and 226 to determine if any of the switches are in the second position. If any of the switches are in the second position, processing circuit 240 may be configured to activate a fault condition. In some embodiments, processing circuit 240 may be configured to cut off power or otherwise shut down operation of whichever of blower motors 160 and 165 are associated with the fault. In some embodiments, processing circuit 240 may be configured to disable operation of all of circuit 200, including traction motors 125 and 135, for example, by removing an excitation current from alternator 110 (e.g., by using an exciter control 111 to discontinue the supply of current through an exciter 112). In some embodiments, processing circuit 240 may be configured to disable operation of the engine. In some embodiments, processing circuit 240 may disable some portions of circuit 200, such as motors 125, 135, 160, and 165, while leaving other portions of circuit 200 operational. In some embodiments, processing circuit 240 may additionally or alternatively be configured to activate an alarm (e.g., aural, visual, etc.) to alert the user of the condition and/or provide the user with information that may be used to perform maintenance and clear the condition.

Figure 3:
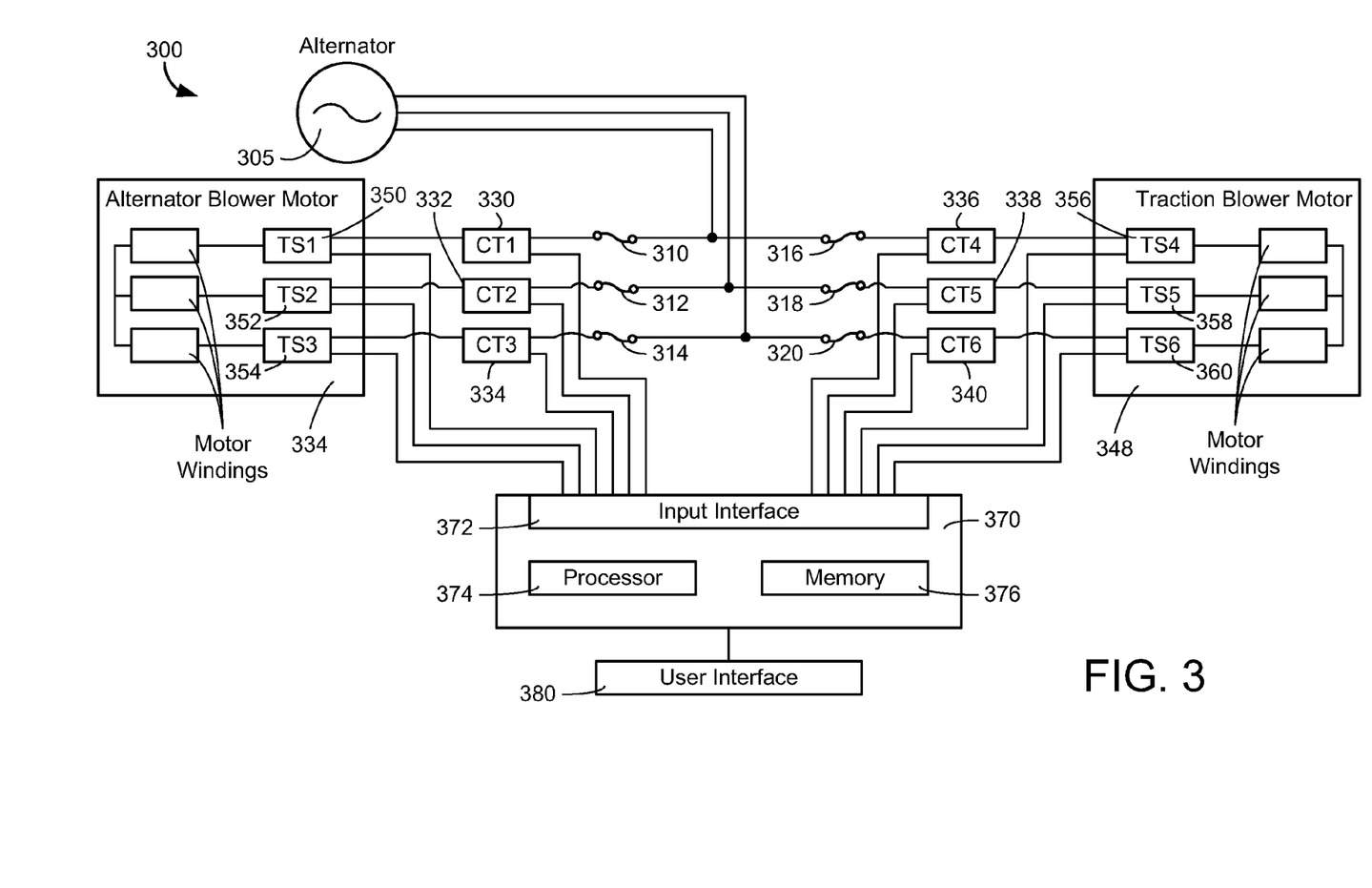
FIG. 3 is a block diagram of a motor protection system according to an exemplary embodiment.

Referring now to FIG. 3, a block diagram of a motor protection system 300 is shown according to an exemplary embodiment. Three-phase power may be provided by an alternator 305 to an alternator blower motor 345 and a traction blower motor 348. The three-phase power lines providing power to alternator blower motor 345 may be protected by three fuses 310, 312, and 314, and the three-phase power lines providing power to traction blower motor 348 may be protected by three fuses 316, 318, and 320.

Motor protection system 300 may provide a separate current transformer device for each input power line of each motor to protect against a single phasing condition on the line. The current transformer devices may be configured to lower a current provided by alternator 305, which may be at a very high level, to a lower current level and compare the lower current to a reference or threshold current level. A first current transformer device 330 may be positioned between fuse 310 and a power input terminal of alternator blower motor 345. First current transformer device 330 is configured to monitor the output current of fuse 310 and determine whether the current drops below a threshold, such as to a near-zero current, indicating the occurrence of a loss of phase. In the event that the current drops below the threshold, a switch of first current transformer device 330 changes states (e.g., from a normally closed state to an open state). Two other current transformer devices 332 and 334 are provided for the other phases of the three-phase power input of alternator blower motor 345 and operate in a similar manner as first current transformer device 330. Three current transformer devices 336, 338, and 340 are provided for the three phases of traction blower motor 348 and operate in a similar manner as first current transformer device 330. In some embodiments, the current transformer devices may be separated from the fuses (e.g., in separate junction boxes) for safety purposes.

A processing circuit 370 may be configured to monitor the state of the switches of current transformer devices 330, 332, 334, 336, 338, and 340 and determine if any of the switches have entered a changed second state, indicating a single phasing condition on at least one of the phase lines of blower motors 345 and/or 348. Processing circuit 370 may include a processor 374 (e.g., any general purpose or special purpose processor) a memory 376 (e.g., any machine-readable storage medium, such as ROM, RAM, flash memory, etc.). Memory 376 may include instructions that are executable by the processor to perform the functions of processing circuit 370.

In the illustrated embodiment, each of the switches may be monitored by a separate input of an input interface 372 for processing circuit 370. In some embodiments, input interface 372 may be a 24 VDC control input interface. Upon detecting activation of one of the inputs due to a change in state of one of the switches, processing circuit 370 may be configured to activate a fault condition. In some embodiments, processing circuit 370 may be configured to deactivate one or more portions of the vehicle in response to the fault condition. In some embodiments, processing circuit 370 may be configured to institute a short delay (e.g., between 1 and 5 seconds, such as 2 seconds) before activating the fault condition to avoid false fault activations due to momentary transient conditions. In some embodiments, processing circuit 370 may be configured to provide an indication of the fault and/or information that may be useful in addressing the fault on a user interface 380 (e.g., a display device, indicator panel, etc.). For example, since each switch is provided on a separate input of input interface 372, processing circuit 370 can determine exactly which switch has changed states and which phase of which motor has been lost. In such an example, processing circuit 370 may provide an indication of which motor and/or which phase is associated with the fault on user interface 380, allowing a user to quickly identify the source of the fault, repair the vehicle and clear the fault, and continue normal operation. In some embodiments, processing circuit 370 may be a processing circuit that controls some or all of the electrical components of the vehicle. In some embodiments, processing circuit 370 may be a separate circuit from a vehicle controller and may be configured to monitor the switches of current transformer devices 330, 332, 334, 336, 338, and 340 and implement functions, such as disabling motors, by transmitting signals to the vehicle controller.

In other embodiments, multiple switches may be monitored by a single input of input interface 372. In some embodiments, current transformer devices 330, 332, 334, 336, 338, and 340 may be grouped into sets, and each set may be connected to a single input of input interface 372. For example, current transformer devices 330, 332, and 334 may be grouped as the current transformers devices protecting alternator blower motor 345, and current transformer devices 336, 338, and 340 may be grouped as the current transformer devices protecting traction blower motor 348. The switches for one set of current transformer devices may be connected to one input of input interface 372, and the switches for the other set of current transformer devices may be connected to a second input. In such an embodiment, the switches of all six current transformer devices 330, 332, 334, 336, 338, and 340 may be monitored by processing circuit 370 using only two inputs instead of the six needed to monitor each using separate inputs, which still allow processing circuit 370 to provide the user with an indication of the motor with which a fault is associated. In some embodiments, such as described below with respect to FIG. 4, all of the switches may be connected to one another (e.g., in a series configuration) and may be connected to a single input of processing circuit 370.

In some embodiments, system 300 may include temperature sensors (e.g., thermostats) configured to monitor a temperature of motors 345 and 348 to prevent against damage to motors 345 and 348 due to overheating. A separate temperature sensor may be provided on windings for each phase of the three-phase power input. For example, a first temperature sensor 350 is provided on a winding connected to the first phase line for alternator blower motor 345 and is configured to monitor the temperature of that winding. If the temperature exceeds a threshold temperature (e.g., 150 degrees Celsius), a switch connected to temperature sensor 350 changes state (e.g., from normally closed to open). Temperature sensors 352 and 354 are configured to monitor the temperature of the other two windings of alternator blower motor 345 and function in a similar manner as temperature sensor 350. Temperature sensors 356, 358, and 360 are configured to monitor the temperature of the windings for traction blower motor 348 and function in a similar manner as temperature sensor 350. Processing circuit 370 may be configured to monitor the switches of temperature sensors 350, 352, 354, 356, 358, and 360 and activate a fault condition if any of the switches is in the changed second state.

Figure 4:
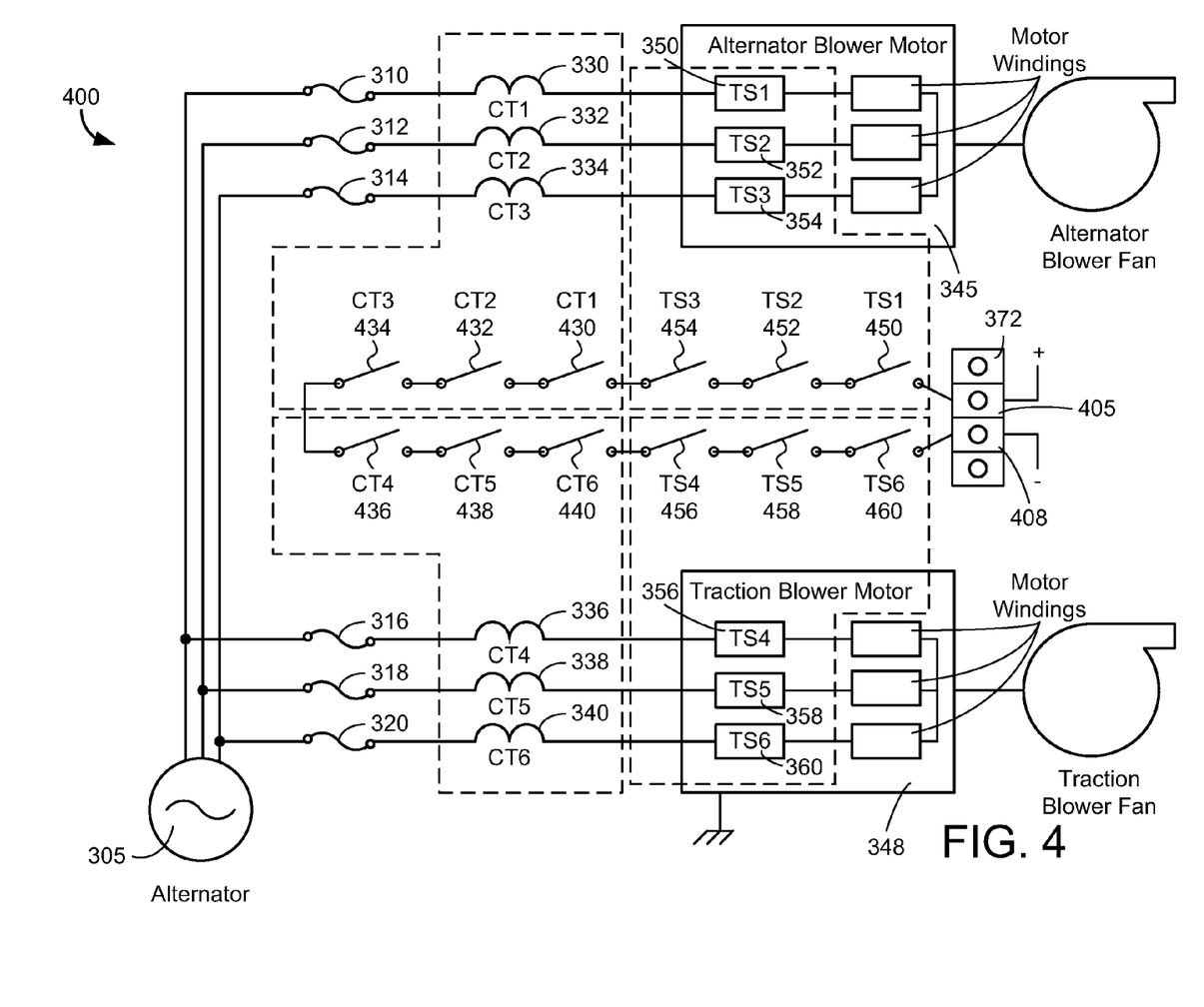
FIG. 4 is a schematic diagram of a motor protection system according to an exemplary embodiment.

Referring now to FIG. 4, a schematic diagram of a motor protection system 400 is shown according to an exemplary embodiment. Motor protection system 400 is an implementation of motor protection system 300 according to one particular exemplary embodiment.

In motor protection system 400, switches 430, 432, 434, 436, 438, and 440 of current transformer devices 330, 332, 334, 336, 338, and 340, respectively, and switches 450, 452, 454, 456, 458, and 460 of temperature sensors 350, 352, 354, 356, 358, and 360 are all connected in series with one another and connected to a single input of input interface 372 for processing circuit 370. The single input includes a positive terminal 405 and a negative terminal 408. The switches in the illustrated embodiment are normally closed switches that are changed to an open position if a current below the current threshold is detected by current transformer devices 330, 332, 334, 336, 338, and/or 340 or a temperature above the temperature threshold is detected by temperature sensors 350, 352, 354, 356, 358, and/or 360. If any one of switches 430, 432, 434, 436, 438, 440, 450, 452, 454, 456, 458, or 460 is opened, the closed circuit between terminals 405 and 408 will become opened, triggering a state change at the input. The state change is sensed by processing circuit 370, which activates a fault condition and/or takes appropriate action, such as deactivating one or more components of the vehicle. In another embodiment, instead of using normally closed switches in a series configuration, motor protection system 400 may utilize normally open switches and place all of the switches in a parallel configuration. In such an embodiment, an open circuit between terminals 405 and 408 may indicate a normal, or non-fault state, and closing of any one of the switches will close the circuit, indicating the occurrence of a single phasing condition.

Figure 5:
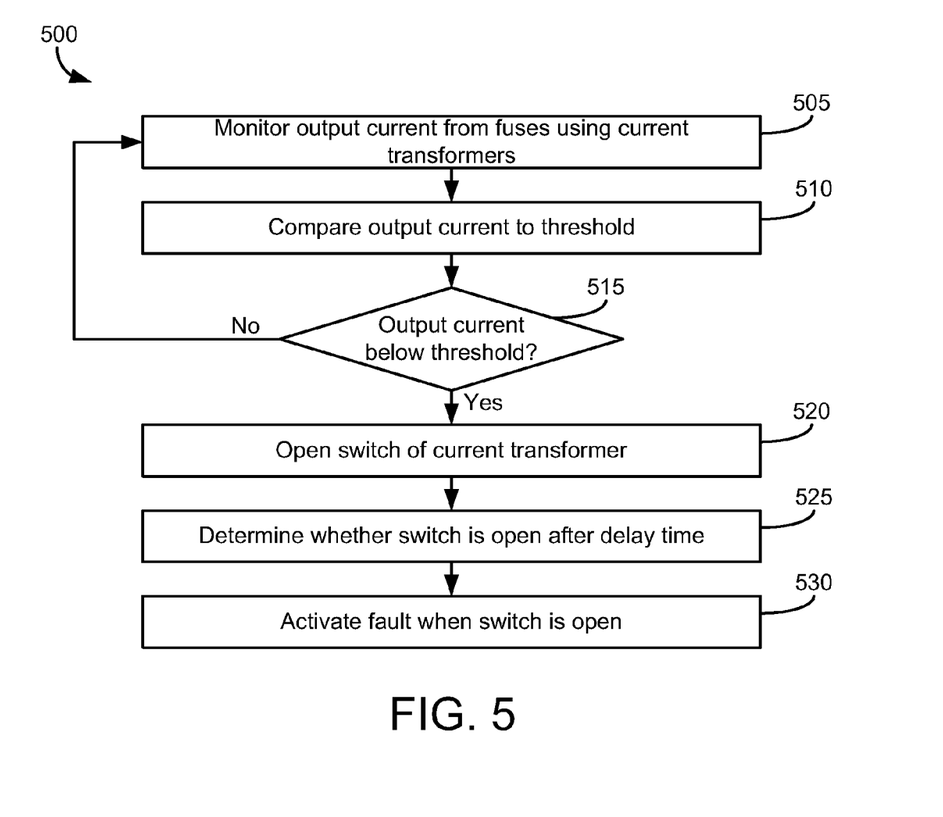
FIG. 5 is a flow diagram of a process for protecting a motor from a single phasing condition according to an exemplary embodiment.

Referring now to FIG. 5, a flow diagram of a process 500 for protecting one or more motors using current transformers is shown according to an exemplary embodiment. In some embodiments, process 500 may be implemented using one or more components illustrated and described with respect to FIGS. 1 through 4.

For each line of a three-phase input power provided to a motor, the current output of a fuse on the line may be monitored using a current transformer device (505). The current transformer device may be configured to compare the output current to a threshold current level (510) and determine whether the output current is below the threshold level (515). If the output current is not below the threshold level, the current transformer device continues to monitor the output current. If the output current is below the threshold level, the current transformer device changes a switch to a different state (e.g., from normally closed to open) (520). A processing circuit monitors the state of the switches of the current transformer devices to determine if any of the switches have been changed to the second (e.g., open) state (525). If so, the processing circuit activates a fault and/or implements other actions, such as disabling the motor and/or other components of the vehicle until the fault is cleared.

Figure 6:
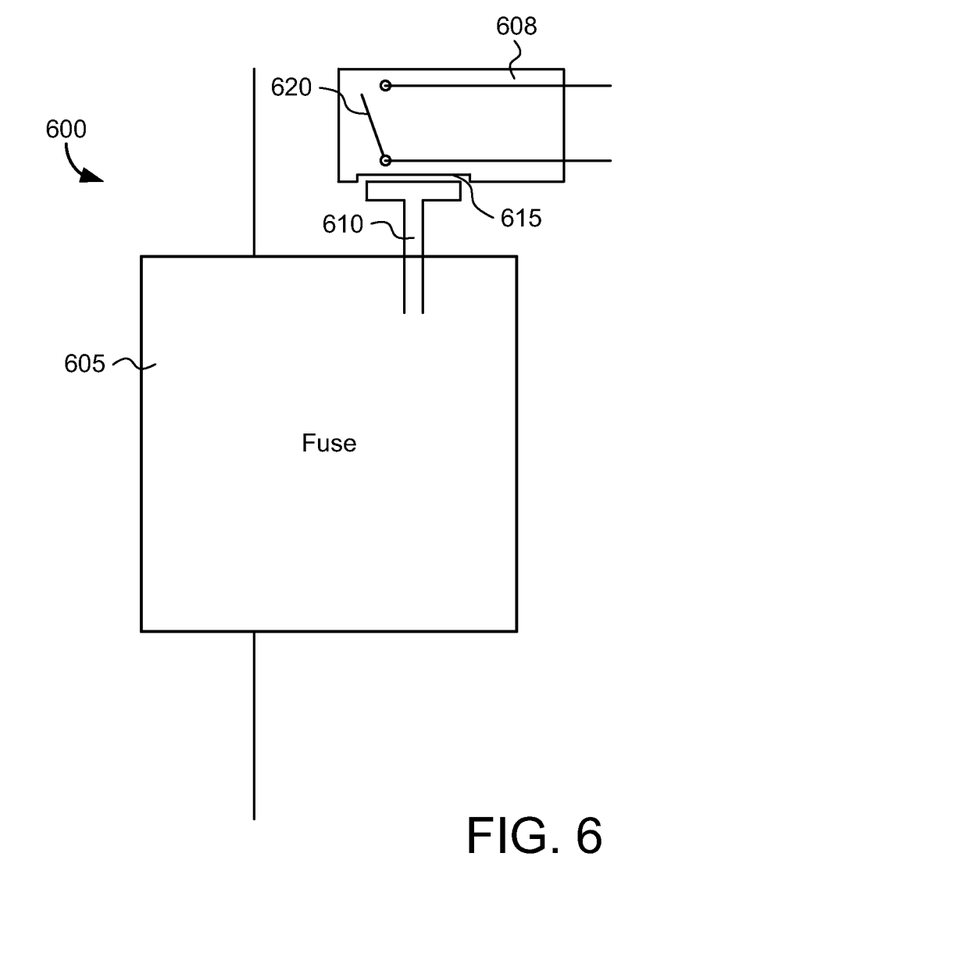
FIG. 6 is an illustration of a fuse system with a mechanically activated blown fuse sensor according to an exemplary embodiment.

In some embodiments, devices other than current transformers may be used to detect a single phasing condition due to a blown fuse. FIG. 6 illustrates a fuse system 600 having a fuse 605 that is designed to actuate a mechanical plunger 610 when the fuse is blown. Plunger 610 contacts a target area 615 of a sensor device 608, causing a switch 620 to change states. Switch 620 may be connected to a processing circuit (e.g., processing circuit 370), and the processing circuit may be configured to monitor switch 620 in a manner similar to the switches of the current transformer devices as discussed in detail above. In some embodiments, an electrical isolation device may be provided between switch 620 and the input of the processing circuit to prevent against high current damage due to the fact that the switch is located physically proximate to the high voltage, high current three-phase input lines to which fuse 605 is connected.

Figure 7:
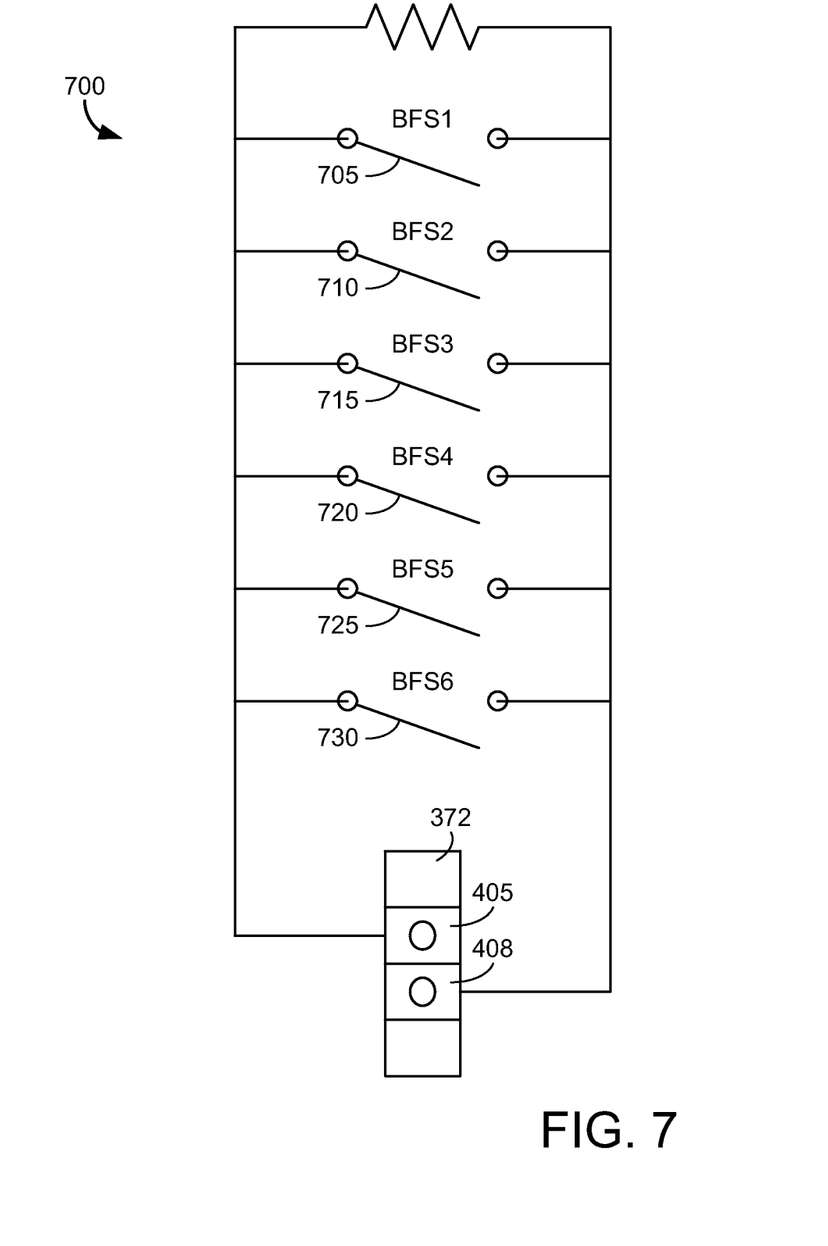
FIG. 7 is a schematic diagram of a motor drive circuit that utilizes the fuse system of FIG. 6 according to an exemplary embodiment.

FIG. 7 illustrates a schematic diagram of a portion of a motor drive system 700 that uses fuse system 600 according to an exemplary embodiment. A separate fuse system 600 may be provided for each phase line of each motor being protected by system 700. For example, a first fuse system having a first switch 705 may be used to monitor a first phase of alternator blower motor 345, a second fuse system having a second switch 710 may be used to monitor a second phase of alternator blower motor 345, a third fuse system having a third switch 715 may be used to monitor a third phase of alternator blower motor 345, a fourth fuse system having a fourth switch 720 may be used to monitor a first phase of traction blower motor 348, a fifth fuse system having a fifth switch 725 may be used to monitor a second phase of traction blower motor 348, and a sixth fuse system having a sixth switch 730 may be used to monitor a third phase of traction blower motor 348. In the illustrated embodiment, the switches are normally open switches connected to terminals 405 and 408 of input interface 372 in a parallel configuration, such that closing of any of the switches will close the circuit and change the state of the input.

Various embodiments disclosed herein may be included in newly designed vehicles or added to existing vehicles, such as through a retrofitting kit. For example, a current transformer device may be added for each phase line of each motor of an existing vehicle for which protection is desired. Wiring may be added to connect the current transformer devices to the outputs of the existing fuses and connect the switches of the current transformer devices to one or more available control inputs of the vehicle controller or other processing circuit. The current transformer devices may be used to monitor fuses of any type, allowing monitoring of the fuses without requiring the fuses to be replaced with special, more expensive types of fuses. This may save substantial maintenance costs over the life of the vehicle, as fuses can become damaged with some frequency.

INDUSTRIAL APPLICABILITY

The disclosed motor protection system may be implemented in any vehicle having an electric system including motors, such as blower motors, that are used to cool components of the vehicle. In some specific exemplary embodiments, the disclosed motor protection system may be implemented in a mining truck (e.g., such as that illustrated in FIG. 1) or in a locomotive. Blowers in a mining truck may be used to push air over the windings of alternators and/or traction motors to cool those components. The disclosed motor protection system may utilize current transformer devices or special fuse systems configured to change the state of switches monitored by a processing circuit to protect against damage to the motor due to a single phasing event.

Referring to FIG. 2, motor drive circuit 200 having motor protection circuitry that may be used in a mining vehicle includes a current transformer set 210 configured to protect an alternator blower motor 165 of the mining vehicle against a single phasing condition and a current transformer set 220 configured to protect a traction blower motor 160 of the mining vehicle against a single phasing condition. Current transformer set 210 includes three separate current transformer devices 212, 214, and 216 configured to monitor the output of the fuses on the first, second, and third lines of the three-phase power input to alternator blower motor 165. Current transformer set 220 includes three separate current transformer devices 222, 224, and 226 configured to monitor the output of the fuses on the first, second, and third lines of the three-phase power input to traction blower motor 160. Each of current transformer devices 212, 214, 216, 222, 224, and 226 is configured to monitor the output current from the fuse to which it is connected and determine whether the output current has dropped below a threshold current (e.g., a low current level indicating that the fuse is no longer effectively transmitting current for its respective phase). When an output current below the threshold is detected, a switch of the respective current transformer device 212, 214, 216, 222, 224, and 226 is switched from a first, normal state or position (e.g., a closed state) to a second state or position (e.g., open).

A processing circuit 240 (e.g., a vehicle controller of the mining vehicle) is configured to monitor the state of the switches and determine if any of the switches is in the second position. If so, processing circuit 240 activates a fault condition. In some embodiments, processing circuit 240 may activate an advisory fault notice that notifies a user of the mining vehicle of the fault condition. In some embodiments, processing circuit 240 may additionally or alternatively deactivate one or more portions of the mining vehicle, such as blower motors 160 and/or 165, traction motors 125 and/or 135, alternator 110, and/or engine 105.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials and components, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure may contemplate methods, systems and program products on any machine-readable storage media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can comprise RAM, ROM, EPROM, EEPROM, CD-ROM or other optical disk storage, magnetic disk storage or other magnetic storage devices, flash memory, or any other medium which can be used to carry or store desired program code in the form of machine-executable instructions or data structures and which can be accessed by a general purpose or special purpose computer or other machine with a processor. Machine-readable storage media are tangible storage media and are non-transitory (i.e., are not merely signals in space). Combinations of the above are also included within the scope of machine-readable storage media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed is:

1. A system for protecting one or more motors of a vehicle, the one or more motors configured to receive three-phase power from an alternator of the vehicle, wherein the vehicle includes a plurality of fuses, each fuse being provided between the alternator and one of the one or more motors of the vehicle for each phase of the three-phase power, the system comprising:
   a plurality of current transformer devices, the plurality of current transformer devices comprising a current transformer device for each phase of each of the one or more motors of the vehicle, each current transformer device comprising a switch that is normally in a first position, wherein each current transformer device is configured to monitor an output current of one of the plurality of fuses, compare the output current to a threshold current level, and, when the output current is below the threshold current level, change the switch to a second position; and
   a processing circuit configured to determine whether one or more of the switches of the plurality of current transformer devices is in the second position, and wherein, when one or more of the switches of the plurality of current transformer devices is determined to be in the second position, the processing circuit is configured to cause a fault condition to be activated.

2. The system of claim 1, wherein each current transformer device is configured to change the switch of the current transformer device to the second position in response to one or both of the fuse monitored by the current transformer device being damaged or a wire of the phase with which the current transformer device is associated becoming loose.

3. The system of claim 1, wherein, upon activation of the fault condition, the processing circuit is configured to disable operation of the one or more motors.

4. The system of claim 1, wherein the one or more motors comprise an alternator blower motor configured to cool the alternator and a traction blower motor configured to cool one or more traction motors of the vehicle.

5. The system of claim 4, wherein the plurality of current transformer devices comprise six current transformer devices, three of which are configured to monitor the phases of the three-phase power received by the alternator blower motor and three of which are configured to monitor the phases of the three-phase power received by the traction blower motor.

6. The system of claim 1, wherein the plurality of current transformer devices are connected in a series configuration and are connected to a single input of the processing circuit, and wherein the single input of the processing circuit is configured to change states if any one of the switches of the plurality of current transformer devices is opened.

7. The system of claim 1, further comprising a plurality of temperature sensors, the plurality of temperature sensors comprising a temperature sensor for each phase of each of the one or more motors of the vehicle, each temperature sensor comprising a switch that is normally in the first position, wherein each temperature sensor is configured to monitor a temperature of a phase of one of the one or more motors, compare the temperature to a threshold temperature level, and, when the temperature is above the threshold temperature level, change the switch to the second position, and wherein the processing circuit is configured to determine whether one or more of the switches of the plurality of temperature sensors is in the second position and, if so, activate the fault condition.

8. The system of claim 7, wherein the plurality of temperature sensors and the plurality of current transformer devices are all connected in a series configuration and are connected to a single input of the processing circuit, and wherein the single input of the processing circuit is configured to change states if any one of the switches of the plurality of current transformer devices and the plurality of temperature sensors are opened.

9. The system of claim 1, wherein the plurality of current transformer devices comprise a plurality of sets of one or more current transformer devices, wherein each set of one or more current transformer devices is connected to a separate input of the processing circuit, and wherein, upon occurrence of the fault condition, the processing circuit is configured to activate an alarm indicating which of the plurality of sets includes a switch in the second position.

10. The system of claim 1, wherein each of the plurality of current transformer devices is connected to a separate input of the processing circuit, and wherein, upon occurrence of the fault condition, the processing circuit is configured to activate an alarm indicating which of the plurality of current transformer devices has a switch in the second position.

11. The system of claim 1, wherein the plurality of current transformer devices are configured to monitor three-phase power having a frequency up to 128 Hz.

12. The system of claim 1, wherein the vehicle is a mining truck.

13. A vehicle comprising:
   an alternator;
   at least one traction motor configured to move at least a portion of the vehicle;
   one or more blower motors configured to cool one or more of the at least one traction motor and the alternator, wherein the one or more blower motors and the at least one traction motor are configured to receive three-phase power from the alternator;
   a plurality of fuses, each fuse being positioned between the alternator and one of the one or more blower motors for each phase of the three-phase power;
   a plurality of current transformer devices, the plurality of current transformer devices comprising a current transformer device for each phase of each of the one or more blower motors, each current transformer device comprising a switch that is normally in a first position, wherein each current transformer device is configured to monitor an output current of one of the plurality of fuses, compare the output current to a threshold current level, and, when the output current is below the threshold current level, change the switch to a second position; and
   a processing circuit configured to determine whether one or more of the switches of the plurality of current transformer devices is in the second position, and wherein, when one or more of the switches of the plurality of current transformer devices is determined to be in the second position, the processing circuit is configured to cause a fault condition to be activated.

14. The vehicle of claim 13, wherein each current transformer device is configured to change the switch of the current transformer device to the second position in response to one or both of the fuse monitored by the current transformer device being damaged or a wire of the phase with which the current transformer device is associated becoming loose.

15. The vehicle of claim 13, wherein, upon activation of the fault condition, the processing circuit is configured to disable operation of the one or more blower motors.

16. The vehicle of claim 13, wherein the one or more blower motors comprise an alternator blower motor configured to cool the alternator and a traction blower motor configured to cool one or more traction motors of the vehicle.

17. The vehicle of claim 16, wherein the plurality of current transformer devices comprise six current transformer devices, three of which are configured to monitor the phases of the three-phase power received by the alternator blower motor and three of which are configured to monitor the phases of the three-phase power received by the traction blower motor.

18. The vehicle of claim 13, wherein the plurality of current transformer devices are connected in a series configuration and are connected to a single input of the processing circuit, and wherein the single input of the processing circuit is configured to change states if any one of the switches of the plurality of current transformer devices is opened.

19. The vehicle of claim 13, further comprising a plurality of temperature sensors, the plurality of temperature sensors comprising a temperature sensor for each phase of each of the one or more motors of the vehicle, each temperature sensor comprising a switch that is normally in the first position, wherein each temperature sensor is configured to monitor a temperature of a phase of one of the one or more blower motors, compare the temperature to a threshold temperature level, and, when the temperature is above the threshold temperature level, change the switch to the second position, and wherein the processing circuit is configured to determine whether one or more of the switches of the plurality of temperature sensors is in the second position and, if so, activate the fault condition.

20. The vehicle of claim 19, wherein the plurality of temperature sensors and the plurality of current transformer devices are all connected in a series configuration and are connected to a single input of the processing circuit, and wherein the single input of the processing circuit is configured to change states if any one of the switches of the plurality of current transformer devices and the plurality of temperature sensors are opened.

21. The vehicle of claim 13, wherein the plurality of current transformer devices comprise a plurality of sets of one or more current transformer devices, wherein each set of one or more current transformer devices is connected to a separate input of the processing circuit, and wherein, upon occurrence of the fault condition, the processing circuit is configured to activate an alarm indicating which of the plurality of sets includes a switch in the second position.

22. The vehicle of claim 13, wherein each of the plurality of current transformer devices is connected to a separate input of the processing circuit, and wherein, upon occurrence of the fault condition, the processing circuit is configured to activate an alarm indicating which of the plurality of current transformer devices has a switch in the second position.

23. The vehicle of claim 13, wherein the plurality of current transformer devices are configured to monitor three-phase power having a frequency up to 128 Hz.

24. The vehicle of claim 13, wherein the vehicle is a mining truck.

25. A method of protecting one or more motors of a vehicle, the one or more motors configured to receive three-phase power from an alternator of the vehicle, wherein the vehicle includes a plurality of fuses, each fuse being provided between the alternator and one of the one or more motors of the vehicle for each phase of the three-phase power, the method comprising:
  monitoring, using a plurality of current transformer devices, output current from the plurality of fuses, wherein the plurality of current transformer devices comprises a current transformer device for each phase of each of the one or more motors of the vehicle and each current transformer device comprises a switch that is normally in a first position, and wherein monitoring output current from the plurality of fuses comprises using a separate current transformer device to monitor an output current of each of the plurality of fuses;
  comparing, at each of the plurality of current transformer devices, the output current to a threshold current level;
  changing, for each of the current transformer devices, the switch of the current transformer device to a second position when the output current is below the threshold current level;
  determining, using a processing circuit configured to control operation of the one or more motors, whether one or more of the switches of the plurality of current transformer devices is in the second position; and
  activating a fault condition when one or more of the switches of the plurality of current transformer devices is determined to be in the second position.

26. The method of claim 25, wherein changing, for each of the current transformer devices, the switch of the current transformer device to the second position when the output current is below the threshold current level comprises changing the switch of the current transformer device to the second position in response to one or both of the fuse monitored by the current transformer device being damaged or a wire of the phase with which the current transformer device is associated becoming loose.

27. The method of claim 25, further comprising disabling, using the processing circuit, operation of the one or more motors in response to activation of the fault condition.

28. The method of claim 25, further comprising connecting the plurality of current transformer devices in a series configuration and connecting the plurality of current transformer devices to a single input of the processing circuit, wherein the single input of the processing circuit is configured to change states if any one of the switches of the plurality of current transformer devices is opened.

* * * * *